United States Patent
Kim et al.

(10) Patent No.: US 10,407,560 B2
(45) Date of Patent: Sep. 10, 2019

(54) PLASTICIZER COMPOSITION, RESIN COMPOSITION, AND METHODS FOR PREPARING SAME

(71) Applicant: LG CHEM, LTD., Seoul (KR)

(72) Inventors: Hyun Kyu Kim, Daejeon (KR); Mi Yeon Lee, Daejeon (KR); Yun Ki Cho, Daejeon (KR); Jeong Ju Moon, Daejeon (KR); Joo Ho Kim, Daejeon (KR); Seok Ho Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/572,388

(22) PCT Filed: Oct. 27, 2016

(86) PCT No.: PCT/KR2016/012163
§ 371 (c)(1),
(2) Date: Nov. 7, 2017

(87) PCT Pub. No.: WO2017/074057
PCT Pub. Date: May 4, 2017

(65) Prior Publication Data
US 2018/0118920 A1    May 3, 2018

(30) Foreign Application Priority Data

Oct. 27, 2015 (KR) .................. 10-2015-0149654

(51) Int. Cl.
*C08K 5/12* (2006.01)
*C08K 5/15* (2006.01)
*C08L 101/00* (2006.01)
*C08K 5/1515* (2006.01)

(52) U.S. Cl.
CPC .............. *C08K 5/12* (2013.01); *C08K 5/1515* (2013.01); *C08L 101/00* (2013.01); *C08K 2201/014* (2013.01)

(58) Field of Classification Search
None
See application file for complete search history.

(56) References Cited

U.S. PATENT DOCUMENTS

| | | |
|---|---|---|
| 3,211,689 A | 10/1965 | Darby et al. |
| 2007/0037926 A1 | 2/2007 | Olsen et al. |
| 2012/0085568 A1 | 4/2012 | Eaton |
| 2013/0137789 A1* | 5/2013 | Olsen ............... C08K 5/12 521/145 |
| 2013/0317153 A1 | 11/2013 | Grass et al. |
| 2014/0309345 A1 | 10/2014 | Frenkel et al. |
| 2015/0010279 A1 | 1/2015 | Sakabe et al. |
| 2015/0078716 A1 | 3/2015 | Sakabe et al. |
| 2015/0111036 A1 | 4/2015 | Chaudhary et al. |
| 2015/0203660 A1* | 7/2015 | Uhr ............... C08K 5/0016 523/122 |

FOREIGN PATENT DOCUMENTS

| | | |
|---|---|---|
| CN | 103242600 A | 8/2013 |
| CN | 103289222 A | 9/2013 |
| CN | 103975011 A | 8/2014 |
| CN | 104774400 A | 7/2015 |
| GB | 1004728 A | 9/1965 |
| JP | 06-001901 A | 1/1994 |
| KR | 10-0724553 B1 | 6/2007 |
| KR | 10-2013-0119947 A | 11/2013 |
| KR | 10-2014-0116371 A | 10/2014 |
| WO | 2014003892 A2 | 1/2014 |

OTHER PUBLICATIONS

Database WPI: "Vinyll chloride resin comsn. for interior trim part for vehicle—is prepd. by adding phthalic acid di: decyl ester and epoxidised oil to vinyll chloride resin", XP002783851, Thomson Scientific, Mar. 25, 2013 (Corresponds to JP06-001901A).
Database WPI: "PVC flooring comprises PVC, plasticizer, heat stabilizer, anti-combustion agent, catalyst, and colorant", XP002783852, Thomson Scientific, Feb. 3, 2014 (Corresponds to CN103242600A).
Database WPI: "Polyvinyl chloride granule composition used for manufacturing e.g. vehicle window sealing strip, comprises polyvinyl chloride resin, elastic modifying agent, crosslinking type powder nitrile rubber, diisononyl ohthalate, and lubricant", XP002783853, Thomson Scientific, Dec. 1, 2015 (Corresponds to CN104774400A).
Database WPI: "Jacket material comprises PVC resin, calcium-zinc compound stabilizer, plasticizer, filler, lubricants, and processing aids", XP002783854, Thomson Scientific, Feb. 5, 2014 (Corresponds to CN103289222A).

\* cited by examiner

*Primary Examiner* — Richard A Huhn
(74) *Attorney, Agent, or Firm* — Dentons US LLP

(57) ABSTRACT

The present invention relates to a plasticizer composition, a resin composition, and methods for preparing the same. The present invention can provide: a plasticizer capable of improving properties, such as plasticization efficiency, transitivity, tensile strength, elongation, and tension/elongation retention, required when a resin composition is used as a plasticizer by improving poor properties caused due to structural limitations; and a resin composition containing the same.

9 Claims, No Drawings

PLASTICIZER COMPOSITION, RESIN COMPOSITION, AND METHODS FOR PREPARING SAME

CROSS-REFERENCE TO RELATED APPLICATION

This application is a National Stage Entry of International Application No. PCT/KR2016/012163, filed Oct. 27, 2016, and claims the benefit of and priority to Korean Application No. 10-2015-0149654, filed on Oct. 27, 2015, all of which are hereby incorporated by reference in their entirety for all purposes as if fully set forth herein.

TECHNICAL FIELD

The present invention relates to a plasticizer composition, a resin composition, and methods for preparing the same.

BACKGROUND ART

Generally, a plasticizer forms an ester corresponding to the plasticizer through a reaction between an alcohol and a polycarboxylic acid such as phthalic acid or adipic acid. Also, there has been continuing research on compositions of plasticizers that can replace phthalate-based plasticizers such as terephthalate-based, adipate-based, and other polymer-based plasticizers in consideration of domestic and international regulations on phthalate-based plasticizers which are harmful to human bodies.

Meanwhile, in compound industries requiring high heat resistance and low volatile loss as main desired physical properties, suitable plasticizers should be generally used in consideration of the desired physical properties. In the case of PVC compounds used for electric wires and cables, additives such as a plasticizer, a stabilizer, and a pigment are mixed with a PVC resin according to characteristics of the PVC compounds required for corresponding specifications, such as tensile strength, elongation rate, plasticizing efficiency, volatile loss, tension/elongation retention, etc.

Recently, because diisodecyl phthalate (DIDP), which is currently typically used as a compound for electric wires and automotive fabrics, is an observational chemical as an environmental hormone, and its use is being regulated due to environmental issues, there is an increasing demand for the development of environmentally friendly products to replace DIDP. Therefore, it is necessary to develop novel products having an equivalent or higher level of quality to replace DIDP.

Accordingly, research has been conducted to secure a vinyl chloride-based resin composition which is free from environmental issues and excellent in terms of quality by developing products made of a novel plasticizer composition which has physical properties superior to the diisodecyl phthalate (DIDP) and is environmentally friendly.

DISCLOSURE

Technical Problem

Therefore, the present inventors have continued to conduct research on plasticizers, and have found a plasticizer composition capable of remarkably improving physical properties of a PVC resin composition. Therefore, the present invention has been completed on the basis of these facts.

That is, it is an object of the present invention to provide a plasticizer capable of improving physical properties, such as hardness, tension/elongation retention, migration resistance, and volatile loss, which are required when the plasticizer is used as a plasticizer of a resin composition, a method for preparing the same, and a resin composition including the plasticizer.

Technical Solution

To solve the above problems, according to one aspect of the present invention, there is provided a plasticizer composition including an epoxidized oil and a phthalate-based material, wherein the epoxidized oil and the phthalate-based material are included at a weight ratio of 99:1 to 1:99.

To solve the above problems, according to another aspect of the present invention, there is provided a method for preparing a plasticizer composition, which includes preparing an epoxidized oil and a phthalate-based material and blending the epoxidized oil and the phthalate-based material at a weight ratio of 99:1 to 1:99 to obtain a plasticizer composition.

To solve the above problems, according to still another aspect of the present invention, there is provided a resin composition including 100 parts by weight of a resin and 5 to 150 parts by weight of the aforementioned plasticizer composition.

Advantageous Effects

The plasticizer composition according to one exemplary embodiment of the present invention can provide excellent physical properties such as migration resistance and resistance to volatility as well as excellent plasticizing efficiency, tensile strength, and elongation rate when used in a resin composition.

Best Mode

Hereinafter, the present invention will be described in detail with reference to embodiments thereof to more clearly describe the present invention. However, it should be understood that the embodiments of the present invention can be implemented in various forms and are not intended to limit the scope of the present invention. The embodiments of the present invention are provided herein to describe the present invention more fully to persons having ordinary skill in the art.

Preparative Example 1: Preparation of DPHP 444.0 g of a phthalic anhydride (PA), 1,425 g of 2-propylheptyl alcohol (2-PH) (a 1.0:3.0 molar ratio of 2-PH to PA), and 1.38 g (0.31 parts by weight based on 100 parts by weight of the PA) of a titanium-based catalyst (tetraisopropyl titanate (TIPT)) serving as a catalyst were added to a 3 L 4-neck reactor equipped with a cooler, a condenser, a decanter, a reflux pump, a temperature controller, an agitator, etc., and slowly heated to approximately 170° C. Produced water started to be generated around approximately 170° C., and an esterification reaction was performed for approximately 4.5 hours while nitrogen gas was continuously added at a reaction temperature of approximately 220° C. under an atmospheric pressure condition. The reaction was terminated when an acid value thereof reached 0.01.

After the reaction was completed, distillation extraction was performed for 0.5 to 4 hours under reduced pressure to remove unreacted raw materials. To remove the unreacted raw materials so that the amount of the unreacted raw materials was lower than a predetermined content, steam extraction was performed for 0.5 to 3 hours at reduced pressure using steam. The reaction solution was cooled to a temperature of approximately 90° C., and then neutralized with an alkaline solution. In addition, the reaction solution was also able to be washed and then dehydrated to remove moisture. A filter medium was added to the moisture-free reaction solution, stirred for a predetermined time, and then filtered to finally obtain 1,313 g of di(2-propylheptyl) phthalate (yield: 98.0%).

Preparative Example 2: Preparation of DINP 1,230 g of diisononyl phthalate (DINP) (yield: 98%) was finally obtained using 444 g of phthalic acid and 1,240 g of isononyl alcohol as reaction raw materials.

Preparative Example 3: Preparation of DIDP 1,315 g of diisodecyl phthalate (DIDP) (yield: 98%) was finally obtained in the same manner as in Preparative Example 1 using 444 g of phthalic acid and 1,425 g of isodecyl alcohol as reaction raw materials.

In Examples 1 to 7, plasticizer compositions were prepared using an epoxidized oil and the compounds prepared in Preparative Examples. The plasticizer compositions are summarized in the following Tables 1 to 7. Then, physical properties of the plasticizer compositions were evaluated according to the following test items.

TABLE 1

| | Phthalate-based material | Epoxidized oil | Mixing weight ratio |
|---|---|---|---|
| Example 1-1 | Preparative Example 1 | ESO | 9:1 |
| Example 1-2 | (DPHP) | | 7:3 |
| Example 1-3 | | | 6:4 |
| Example 1-4 | | | 3:7 |
| Example 2-1 | | ELO | 9:1 |
| Example 2-2 | | | 7:3 |
| Example 2-3 | | | 6:4 |
| Example 2-4 | | | 3:7 |

TABLE 2

| | Phthalate-based material | Epoxidized oil | Mixing weight ratio |
|---|---|---|---|
| Example 3-1 | Preparative Example 2 | ESO | 9:1 |
| Example 3-2 | (DINP) | | 7:3 |
| Example 3-3 | | | 5:5 |
| Example 3-4 | | | 3:7 |
| Example 4-1 | | ELO | 9:1 |
| Example 4-2 | | | 7:3 |
| Example 4-3 | | | 5:5 |
| Example 4-4 | | | 3:7 |

TABLE 3

| | Phthalate-based material | Epoxidized oil | Mixing weight ratio |
|---|---|---|---|
| Example 5-1 | Preparative Example 3 | ESO | 7:3 |
| Example 5-2 | (DINP) | | 5:5 |
| Example 5-3 | | | 3:7 |
| Example 5-4 | | ELO | 7:3 |

TABLE 4

| | Phthalate-based material | Epoxidized oil | Terephthalate-based material | Mixing weight ratio |
|---|---|---|---|---|
| Example 6-1 | Preparative | ESO | DEHTP | (3:4):3 |
| Example 6-2 | Example 1 | | | (2:3):5 |
| Example 6-3 | (DPHP) | | | (4:2):4 |
| Example 6-4 | Preparative | | | (3:4):3 |
| Example 6-5 | Example 2 | | | (2:5):3 |
| Example 6-6 | (DINP) | | | (5:3):2 |

TABLE 5

| | Phthalate-based material | Epoxidized oil | Terephthalate-based material | Mixing weight ratio |
|---|---|---|---|---|
| Example 7-1 | Preparative | ESO | DINTP | (2:1):7 |
| Example 7-2 | Example 1 | | | (2:2):6 |
| Example 7-3 | (DPHP) | | | (3:1):6 |
| Example 7-4 | | | DPHTP | (2:1):7 |
| Example 7-5 | | | | (2:2):6 |
| Example 7-6 | | | | (3:1):6 |

<Test Items>

Measurement of Hardness

Shore A hardness at 25° C., 3T 10 s was measured using ASTM D2240.

Measurement of Tensile Strength

Through an ASTM D638 method, a specimen was drawn at a cross head speed of 200 mm/min (1T) using a test apparatus, U.T.M (Manufacturer: Instron, Model name: 4466), and a point at which the specimen was broken was then measured. The tensile strength was calculated as follows.

$$\text{Tensile strength (kgf/mm}^2\text{)} = \text{Load value (kgf)} / \text{Thickness (mm)} \times \text{Width (mm)}$$

Measurement of Elongation Rate

Through an ASTM D638 method, a specimen was drawn at a cross head speed of 200 mm/min (1T) using the U.T.M, and a point at which the specimen was broken was then measured. The elongation rate was calculated as follows.

$$\text{Elongation rate (\%)} = [\text{Length after elongation/Initial length}] \times 100$$

Measurement of Migration Loss

A specimen having a thickness of 2 mm or more was obtained according to KSM-3156, PS plates were attached to both sides of the specimen, and a load of 2 kgf/cm² was then applied thereto. The specimen was placed in a forced convection oven (80° C.) for 72 hours, taken out, and then cooled at room temperature for 4 hours. Thereafter, the PS plates attached to both of the sides of the specimen were removed, and weights of the specimens were measured before and after the specimens were placed in the oven. Then, migration loss was calculated through the following equation.

$$\text{Migration loss (\%)} = [(\text{Initial weight of specimen at room temperature} - \text{Weight of specimen after being placed in oven})/\text{Initial weight of specimen at room temperature}] \times 100$$

Measurement of Volatile Loss

The specimen thus prepared was stored for 168 hours at a temperature that meets UL standards for each formulation, and a weight of the specimen was then measured.

Volatile loss (%)=[(Initial weight of specimen−Weight of specimen after processing)/Initial weight of specimen]×100

Measurement of Absorption Rate

A resin and an ester compound were mixed under conditions of a constant temperature and constant revolutions per minute (rpm) using a Planatary mixer (Brabender, P600), and a time elapsed until a torque of the mixer was in a stabilized state was measured to determine an absorption rate.

Stress Test

A stress test was carried out by keeping the specimen in a bent state at room temperature for a predetermined time, and then observing a degree of migration (a leaking degree) that was then indicated by a numerical value. In this case, the nearer a numerical value is to 0, the better the characteristics of the specimen were.

Measurement of Tension/Elongation Retention

A measurement of tension/elongation retention was carried out by applying heat to a specimen at a constant temperature for a predetermined time and measuring tension and elongation characteristics retained in the specimen. A method of measuring the tension/elongation retention was performed in the same manner as in the measurement of the tensile strength and the elongation rate.

Measurement of Cold Resistance

Five specimens thus prepared were kept at a certain temperature for 3 minutes, and then struck to measure a temperature at which 3 of the five specimens were broken.

Experimental Example 1: DPHP-Based Plasticizer Composition

1. Mixed Plasticizer Composition of DPHP and ESO In Examples 1-1 to 1-4, DPHP and ESO were mixed at the mixing ratios listed in Table 1 to obtain mixed plasticizer compositions, which were then used as test specimens.

The specimens were manufactured as follows with reference to ASTM D638. 50 parts by weight of each of the mixed plasticizer compositions, 40 parts by weight of a filler (OMYY A1T), 5 parts by weight of a stabilizer (RUP-144), and 0.3 parts by weight of a lubricant (St-A) were mixed with 100 parts by weight of PVC at 98° C. and 700 rpm in a 3 L super mixer. Thereafter, the resulting mixture was processed at 160° C. for 4 minutes in a roll mill to prepare 5 mm-thick sheets, and the sheet were processed at 180° C. for 2.5 minutes at a low pressure and 2 minutes at a high pressure using a press to prepare 1 to 3 mm-thick sheets to manufacture specimens. Physical properties were evaluated for each of the specimens on the basis of the aforementioned test items. The results are listed in the following Table 6.

TABLE 6

|  | Example 1-1 | Example 1-2 | Example 1-3 | Example 1-4 | Comparative Example 1 |
|---|---|---|---|---|---|
| Plasticizer | 9:1 | 7:3 | 6:4 | 3:7 | DPHP |
| Hardness | 87.2 | 86.4 | 86.0 | 86.2 | 88.1 |
| Tensile strength (kg/cm$^2$) | 175.6 | 173.2 | 171.0 | 170.5 | 170.2 |
| Tension retention (%) | 102.4 | 104.8 | 107.4 | 106.9 | 95.0 |
| Elongation rate (%) | 297.5 | 299.1 | 298.7 | 302.6 | 289.9 |
| Elongation retention (%) | 87.3 | 89.6 | 93.1 | 97.5 | 71.2 |
| Migration loss (%) | 0.73 | 0.57 | 0.48 | 0.24 | 1.86 |
| Volatile loss (%) | 3.70 | 2.92 | 2.34 | 2.01 | 5.90 |
| Absorption rate (m:s) | 4:35 | 3:90 | 3:61 | 3:42 | 4:75 |
| Stress test | 0.5 | 0.5 | 0.5 | 0 | 1.0 |

Hardness: Shore "A"

Tension retention and elongation retention: 121, 168 hours

Volatile loss: 121, 168 hours

Absorption rate: 88, 60 rpm

Stress test: 23, 168 hours

As listed in Table 6, it can be seen that the resin specimens in which the mixture of DPHP and epoxidized oil was used as the plasticizer had improved mechanical properties such as tensile strength, tension/elongation retention, elongation rate, and the like, compared to the single phthalate-based products, and also had improved processability due to a decrease in hardness. In addition, it can be seen that the resin specimens in which the mixture of DPHP and epoxidized oil was used as the plasticizer had improved loss characteristics due to a reduction in volatile loss or migration loss, and also had improved resistance to stress.

2. Mixed Plasticizer Composition of DPHP and ELO

In Examples 2-1 to 2-4, DPHP and ELO were mixed at the mixing ratios listed in Table 1 to obtain mixed plasticizer compositions, which were then used as test specimens. The specimens were manufactured in the same manner as in [1. Mixed Plasticizer Composition of DPHP and ESO]. The results are listed in the following Table 7.

TABLE 7

|  | Example 2-1 | Example 2-2 | Example 2-3 | Example 2-4 | Comparative Example 1 |
|---|---|---|---|---|---|
| Plasticizer | 9:1 | 7:3 | 6:4 | 3:7 | DPHP |
| Hardness | 87.1 | 86.3 | 86.0 | 86.1 | 88.1 |
| Tensile strength (kg/cm$^2$) | 179.3 | 176.7 | 173.5 | 170.8 | 170.2 |
| Tension retention (%) | 105.1 | 110.4 | 111.9 | 114.1 | 95.0 |
| Elongation rate (%) | 300.2 | 304.7 | 308.8 | 308.1 | 289.9 |
| Elongation retention (%) | 89.8 | 90.4 | 95.6 | 102.3 | 71.2 |
| Migration loss (%) | 0.75 | 0.48 | 0.40 | 0.22 | 1.86 |
| Volatile loss (%) | 3.52 | 2.64 | 2.05 | 1.86 | 5.90 |
| Absorption rate (m:s) | 440 | 398 | 367 | 340 | 475 |
| Stress test | 0.5 | 0.5 | 0 | 0 | 1.0 |

Hardness: Shore "A"
Tension retention and elongation retention: 121, 168 hours
Volatile loss: 121, 168 hours
Absorption rate: 88, 60 rpm
Stress test: 23, 168 hours As listed in Table 7, it can be seen that the resin specimens in which the mixture of DPHP and epoxidized oil was used as the plasticizer had improved mechanical properties such as tensile strength, tension/elongation retention, elongation rate, and the like, compared to the single phthalate-based products, and also had improved processability due to a decrease in hardness. In addition, it can be seen that the resin specimens in which the mixture of DPHP and epoxidized oil was used as the plasticizer had improved loss characteristics due to a reduction in volatile loss or migration loss, and also had improved resistance to stress.

Experimental Example 2: DINP-Based Plasticizer Composition

1. Mixed Plasticizer Composition of DINP and ESO

In Examples 3-1 to 3-4, DINP and ESO were mixed at the mixing ratios listed in Table 2 to obtain mixed plasticizer compositions, which were then used as test specimens. The specimens were manufactured and evaluated in the same manner as in [1. Mixed Plasticizer Composition of DPHP and ESO]. The results are listed in the following Table 8.

As listed in Table 8, it can be seen that the resin specimens in which the mixture of DINP and epoxidized oil was used as the plasticizer had improved mechanical properties such as tensile strength, tension/elongation retention, elongation rate, and the like, compared to the single phthalate-based products, and also had improved loss characteristics due to a reduction in volatile loss or migration loss.

2. Mixed Plasticizer Composition of DINP and ELO

In Examples 4-1 to 4-4, DINP and ELO were mixed at the mixing ratios listed in Table 2 to obtain mixed plasticizer compositions, which were then used as test specimens. The specimens were manufactured in the same manner as in [1. Mixed Plasticizer Composition of DPHP and ESO]. The results are listed in the following Table 9.

TABLE 8

|  | Example 3-1 | Example 3-2 | Example 3-3 | Example 3-4 | Comparative Example 2 |
|---|---|---|---|---|---|
| Plasticizer | 9:1 | 7:3 | 5:5 | 3:7 | DINP |
| Hardness | 85.7 | 86.1 | 86.4 | 87.0 | 85.5 |
| Tensile strength (kg/cm$^2$) | 183.0 | 183.2 | 185.0 | 190.8 | 178.9 |
| Tension retention (%) | 96.4 | 97.6 | 104.3 | 105.8 | 93.9 |
| Elongation rate (%) | 282.5 | 284.4 | 292.2 | 298.1 | 270.3 |
| Elongation retention (%) | 98.5 | 97.4 | 104.8 | 105.1 | 93.2 |
| Migration loss (%) | 1.13 | 1.00 | 0.86 | 0.50 | 1.38 |
| Volatile loss (%) | 0.68 | 0.37 | 0.09 | 0.05 | 1.13 |

Hardness: Shore "A"
Tension retention and elongation retention: 100, 168 hours
Volatile loss: 100, 168 hours

TABLE 9

|  | Example 4-1 | Example 4-2 | Example 4-3 | Example 4-4 | Comparative Example 2 |
|---|---|---|---|---|---|
| Plasticizer | 9:1 | 7:3 | 6:4 | 3:7 | DPHP |
| Hardness | 85.6 | 86.0 | 86.2 | 86.8 | 85.5 |
| Tensile strength (kg/cm$^2$) | 183.5 | 183.8 | 187.2 | 191.8 | 178.9 |
| Tension retention (%) | 98.5 | 103.6 | 104.0 | 107.9 | 93.9 |
| Elongation rate (%) | 291.2 | 295.5 | 296.5 | 302.1 | 270.3 |
| Elongation retention (%) | 95.6 | 97.4 | 99.7 | 101.2 | 93.2 |
| Migration loss (%) | 0.35 | 1.02 | 0.66 | 0.42 | 1.38 |
| Volatile loss (%) | 0.78 | 0.55 | 0.24 | 0.12 | 1.13 |

Hardness: Shore "A"
Tension retention and elongation retention: 100, 168 hours
Volatile loss: 100, 168 hours As listed in Table 9, it can be seen that the resin specimens in which the mixture of DINP and epoxidized oil was used as the plasticizer had improved mechanical properties such as tensile strength, tension/elongation retention, elongation rate, and the like, compared to the single phthalate-based products, and also had improved loss characteristics due to a reduction in volatile loss or migration loss.

Experimental Example 3: DIDP-Based Mixed Plasticizer Composition

In Examples 5-1 to 5-4, DIDP and ESO or ELO were mixed at the mixing ratios listed in Table 3 to obtain mixed plasticizer compositions, which were then used as test specimens. The specimens were manufactured and evaluated in the same manner as in [1. Mixed Plasticizer Composition of DPHP and ESO]. The results are listed in the following Table 10.

were used had equivalent or higher performance, compared to the DIDP of Comparative Example 3 used as a plasticizer having excellent performance, and exhibited superior performance to the DPHP of Comparative Example 1. In particular, it can be seen that the plasticizer compositions had excellent tension retention and elongation retention and had especially improved migration loss and volatile loss.

Experimental Example 4: Mixed Plasticizer Composition of Three Components

1. DEHTP-added mixed plasticizer composition

In Examples 6-1 to 6-6, DPHP or DINP and ESO were mixed at the mixing ratios listed in Table 4, and DEHTP was then mixed therewith to obtain mixed plasticizer compositions, which were then used as test specimens. The specimens were manufactured and evaluated in the same manner

TABLE 10

|  | Example 5-1 | Example 5-2 | Example 5-3 | Example 5-4 | Comparative Example 1 | Comparative Example 3 |
|---|---|---|---|---|---|---|
| Plasticizer | 7:3 | 5:5 | 3:7 | 7:3 | DPHP | DIDP |
| Shore "A" | 85.9 | 85.5 | 85.4 | 85.3 | 88.1 | 86.4 |
| Shore "D" | 43.9 | 44.0 | 43.9 | 44.5 | 46.5 | 45.7 |
| Tensile strength (kg/cm$^2$) | 165.3 | 170.4 | 169.4 | 175.9 | 170.2 | 173.1 |
| Tension retention (%) | 105.0 | 101.8 | 99.9 | 104.5 | 95.0 | 96.6 |
| Elongation rate (%) | 313.3 | 323.5 | 323.7 | 311.0 | 289.9 | 312.4 |
| Elongation retention (%) | 96.9 | 98.4 | 101.5 | 93.3 | 71.2 | 91.1 |
| Migration loss (%) | 0.95 | 0.83 | 0.23 | 0.89 | 1.86 | 1.68 |
| Volatile loss (%) | 1.46 | 0.44 | 0.21 | 1.70 | 5.90 | 2.99 |
| Absorption rate (m:s) | 4:21 | 4:15 | 3:98 | 3:87 | 4:75 | 4:40 |

*Hardness: Shore "A" and "D"
*Tension retention and elongation retention: 121, 168 hours
*Volatile loss: 121, 168 hours
*Absorption rate: 80° C., PVC 100 parts by weight/plasticizer 50 parts by weight As listed in Table 10, it can be seen that the resins in which the plasticizer compositions of Examples 5-1 to 5-4 as in [1. Mixed Plasticizer Composition of DPHP and ESO]. The results are listed in the following Table 11.

TABLE 11

|  | Example 6-1 | Example 6-2 | Example 6-3 | Example 6-4 | Example 6-5 | Example 6-6 | Comparative Example 3 |
|---|---|---|---|---|---|---|---|
| Plasticizer | 3:4:3 | 2:3:5 | 4:2:4 | 3:4:3 | 2:5:3 | 5:3:2 | DIDP |
| Hardness | 41.1 | 40.9 | 41.1 | 39.6 | 39.1 | 38.7 | 45.7 |
| Tensile strength (kg/cm$^2$) | 178.2 | 182.3 | 182.2 | 178.7 | 171.9 | 173.5 | 173.1 |
| Tension retention (%) | 104.0 | 97.8 | 101.5 | 100.4 | 103.8 | 104.4 | 96.6 |
| Elongation rate (%) | 313.6 | 315.8 | 318.3 | 315.5 | 322.0 | 320.5 | 312.4 |
| Elongation retention (%) | 96.8 | 97.6 | 95.0 | 93.3 | 98.5 | 95.2 | 91.1 |

TABLE 11-continued

|  | Example 6-1 | Example 6-2 | Example 6-3 | Example 6-4 | Example 6-5 | Example 6-6 | Comparative Example 3 |
|---|---|---|---|---|---|---|---|
| Migration loss (%) | 0.76 | 0.91 | 1.19 | 0.71 | 0.53 | 0.97 | 1.68 |
| Absorption rate (m:s) | 4:25 | 3:87 | 4:18 | 3:68 | 3:89 | 3:56 | 4:40 |
| Stress test | 0 | 0 | 0 | 0 | 0 | 0 | 0.5 |

*hardness: Shore "D"
*tension retention and elongation retention: 121, 168 hours
*volatile loss: 121, 168 hours
*absorption rate: at 80° C., PVC 100 parts by weight/plasticizer 50 parts by weight
*stress test: 23, 168 hours As listed in Table 11, it can be seen that the resins in which the plasticizer compositions of Examples 6-1 to 6-6 were used had an excellent effect of improving physical properties such as tension retention and elongation retention and had improved migration loss characteristics, compared to the DIDP which has been used for similar purposes and is currently commercialized. In particular, it can be seen that the plasticizer compositions had a significant advantage in terms of plasticizing efficiency due to a decrease in hardness. Also, it can be seen that the plasticizer compositions were able to be effectively used as alternative products because the plasticizer compositions also exhibited equivalent or higher physical properties such as tensile strength, elongation rate, absorption rate, etc. in addition to the aforementioned physical properties.

2. DINTP- or DPHTP-Added Mixed Plasticizer Composition

In Examples 7-1 to 7-6, DPHP and ESO were mixed at the mixing ratios listed in Table 5, and DINTP or DPHTP was then mixed therewith to obtain mixed plasticizer compositions, which were then used as test specimens. The manufacture of the specimens and evaluation of physical properties thereof were performed in the same manner as in [1. Mixed Plasticizer Composition of DPHP and ESO]. The results are listed in the following Table 12.

TABLE 12

|  | Example 7-1 | Example 7-2 | Example 7-3 | Example 7-4 | Example 7-5 | Example 7-6 | Comparative Example 1 |
|---|---|---|---|---|---|---|---|
| plasticizer | 2:1:7 | 2:2:6 | 3:1:6 | 2:1:7 | 2:2:6 | 3:1:6 | DPHP |
| hardness | 88.3 | 88.1 | 88.0 | 90.0 | 89.5 | 89.5 | 88.1 |
| tensile strength(kg/cm$^2$) | 183.2 | 184.7 | 183.8 | 181.8 | 184.4 | 182.0 | 170.2 |
| tension retention(%) | 98.9 | 103.8 | 102.9 | 103.8 | 99.9 | 104.6 | 95.0 |
| elongation rate(%) | 281.3 | 282.0 | 284.0 | 291.5 | 281.4 | 287.7 | 289.9 |
| elongation retention(%) | 94.2 | 93.3 | 90.9 | 93.7 | 98.1 | 94.2 | 71.2 |
| migration loss(%) | 2.45 | 2.15 | 2.15 | 2.96 | 2.31 | 2.32 | 1.86 |
| volatile loss(%) | 1.95 | 1.90 | 2.41 | 1.13 | 0.96 | 1.14 | 5.90 |
| cold resistance(° C.) | −33.0 | −32.0 | −33.0 | −31.0 | −30.0 | −30.5 | −28.0 |
| absorption rate(m:s) | 450 | 435 | 442 | 660 | 570 | 585 | 475 |

*Hardness: Shore "A"
*Tension retention and elongation retention: 121, 168 hours
*Volatile loss: 121, 168 hours
*Absorption rate: at 80° C., PVC 100 parts by weight/plasticizer 50 parts by weight
*Stress test: 23, 168 hours As listed in Table 12, it can be seen that the resins in which the plasticizer compositions of Examples 7-1 to 7-6 were used had an excellent effect of improving physical properties such as tension retention and elongation retention and had improved loss characteristics due to a significant decrease in volatile loss, compared to the DPHP which has been used for similar purposes and is currently commercialized. Also, it can be seen that the plasticizer compositions were able to be effectively used as alternative products in the field of compounds because the plasticizer compositions also exhibited equivalent or higher physical properties such as tensile strength, elongation rate, absorption rate, etc. in addition to the aforementioned physical properties.

Although preferred embodiments of the present invention have been shown and described in detail, it should be appreciated by those skilled in the art that various modifications and changes may be made in these embodiments without departing from the principles and spirit of the present invention, the scope of which is defined in the claims and their equivalents.

Mode for Invention

Hereinafter, the present invention will be described in detail.

First, the present invention has a technical feature in that a plasticizer composition capable of improving inferior physical properties caused due to structural limitations is provided.

According to one exemplary embodiment of the present invention, a plasticizer composition including an epoxidized oil may be provided. Specifically, the epoxidized oil may be used at a content of 1 to 99% by weight, 10 to 99% by weight based on a total weight of the composition. Preferably, the epoxidized oil may be used at a content selected from the group consisting of 1 to 50% by weight, 5 to 50% by weight, 5 to 45% by weight, 5 to 40% by weight, 10 to 40% by weight, and the like.

The epoxidized oil may, for example, include one or more selected from the group consisting of epoxidized soybean oil, epoxidized castor oil, epoxidized linseed oil, epoxidized palm oil, epoxidized stearic acid, epoxidized oleic acid, epoxidized tall oil, epoxidized linoleic acid, epoxidized stearate, epoxidized oleate, and epoxidized linoleate.

Preferably, the epoxidized oil may include one or more selected from the group consisting of epoxidized soybean oil (ESO) and epoxidized linseed oil (ELO).

When such an epoxidized oil is used as the plasticizer, the plasticizer composition may have improved migration, compared to conventional products, and the epoxidized oil may be suitably used as a plasticizer for improving migration due to relatively excellent economic feasibility thereof, compared to other products capable of improving the migration.

Also, according to one exemplary embodiment of the present invention, the plasticizer composition may further include a phthalate-based material. In this case, diisodecyl phthalate (DIDP), diisononyl phthalate (DINP), and dipropylheptyl phthalate (DPHP) may be used as the phthalate-based material, and dipropylheptyl phthalate may be most preferably used. Also, diisodecyl phthalate is a material having environmental issues, but may be used for purposes relatively free of the environmental problems or the content thereof may be adjusted to cope with the environmental problems when necessary. Accordingly, di(2-propylheptyl) phthalate is preferably used, and diisononyl phthalate may also be used herein. When necessary, diisononyl phthalate is likely to be used.

However, unlike the diisodecyl phthalate, di(2-ethylhexyl) phthalate may not be commercially available because the di(2-ethylhexyl) phthalate is a material designated as an environmentally hazardous material.

According to one exemplary embodiment of the present invention, the epoxidized oil and the phthalate-based material in the plasticizer composition may be included at a weight ratio of 99:1 to 1:99. For example, the epoxidized oil and the phthalate-based material may be included at a weight ratio of 99:1 to 5:95, 99:1 to 10:90, 99:1 to 15:85, or 99:1 to 20:80, and may preferably be included at a weight ratio of 95:5 to 20:80.

Also, it may be desirable for an excessive amount of the phthalate-based material to be included, for example, at a weight ratio of 50:50 to 5:95, 45:65 to 5:95, 40:60 to 10:90, 40:60 to 15:85, or 40:60 to 20:80. In this way, when the phthalate-based material is used together with the epoxidized oil, cold resistance, which is a problem of the epoxidized oil, may be improved and desired effects such as improved physical properties may be achieved when the phthalate-based material is used in a range which does not influence the environment.

The plasticizer composition includes the epoxidized oil and the phthalate-based material, and may also include a terephthalate-based material.

The plasticizer composition in which the epoxidized oil and the phthalate-based material are mixed may have relatively poor plasticizing efficiency and cold-resistant characteristics with respect to various physical properties. Such poor plasticizing efficiency and cold-resistant characteristics may be compensated for when the plasticizer composition further include the terephthalate-based material.

The terephthalate-based material may be used as a single compound or a mixture of two or more compounds selected from the group consisting of di(2-ethylhexyl) terephthalate (DEHTP), diisononyl terephthalate (DINTP), di(2-propylheptyl) terephthalate (DPHTP), dibutyl terephthalate (DBTP), butyl isononyl terephthalate (BINTP), butyl (2-ethylhexyl) terephthalate (BEHTP), and (2-ethylhexyl)isononyl terephthalate (EHINTP), but the present invention is not limited thereto.

The terephthalate-based material may be properly included at a content of approximately 1 to 300 parts by weight, preferably be included at a content of 10 to 300 parts by weight, and more preferably be included at a content of 20 to 250 parts by weight, based on 100 parts by weight of the sum of weights of the epoxidized oil and the phthalate-based material.

The terephthalate-based material added in this content range may further improve physical properties of the plasticizer without causing problems such as degraded migration and volatile loss. However, the amount of the terephthalate-based material added may be adjusted according to the type thereof. In this case, it is necessary to properly control the amount of the terephthalate-based material for a purpose. For example, when the terephthalate-based material is used for compounds, it may be more suitable to add the terephthalate-based material at a content of approximately 150 parts by weight or more with regard to the physical properties. In other cases, it is suitable to add the terephthalate-based material at a content of 100 parts by weight or less with regard to the physical properties.

More specifically, when the terephthalate-based material is a single compound, the terephthalate-based material may be di(2-ethylhexyl) terephthalate, di(2-propylheptyl) terephthalate, or diisononyl terephthalate. When the terephthalate-based material is a mixture, the terephthalate-based material may be a mixture of three terephthalate-based materials. For example, the terephthalate-based material may be a first mixture in which di(2-ethylhexyl) terephthalate, butyl (2-ethylhexyl) terephthalate, and dibutyl terephthalate are mixed, a second mixture in which diisononyl terephthalate, butyl isononyl terephthalate, and dibutyl terephthalate are mixed, and a third mixture in which di(2-ethylhexyl) terephthalate, (2-ethylhexyl)isononyl terephthalate, and diisononyl terephthalate are mixed.

Specifically, the first to third mixtures may have certain composition ratios. For example, the first mixture may include 3.0 to 99.0 mol % of di(2-ethylhexyl) terephthalate; 0.5 to 96.5 mol % of butyl (2-ethylhexyl) terephthalate, and 0.5 to 96.5 mol % of dibutyl terephthalate, the second mixture may include 3.0 to 99.0 mol % of diisononyl terephthalate; 0.5 to 96.5 mol % of butyl isononyl terephthalate, and 0.5 to 96.5 mol % of dibutyl terephthalate, and the third mixture may include 3.0 to 99.0 mol % of di(2-ethylhexyl) terephthalate; 0.5 to 96.5 mol % of (2-ethylhexyl)isononyl terephthalate, and 0.5 to 96.5 mol % of diisononyl terephthalate.

The composition ratios may be mixing composition ratios obtained through an esterification reaction, and may also be desired composition ratios obtained by additionally adding a certain compound to the corresponding mixture. For example, the mixing composition ratios may be properly adjusted to meet the desired physical properties.

In the present invention, a method for preparing the plasticizer composition may be carried out using a blending method. One example of the blending method is as follows.

The plasticizer composition may be prepared by preparing an epoxidized oil and a phthalate-based material and blending the epoxidized oil and the phthalate-based material at a weight ratio of 1:99 to 99:1.

The phthalate-based material may be prepared through a direct esterification reaction in which phthalic acid reacts with one or more alcohols selected from the group consisting of 2-ethylhexyl alcohol, isononyl alcohol, isodecyl alcohol, and propylheptyl alcohol.

The direct esterification reaction may include adding phthalic acid to an alcohol, adding a catalyst thereto, and allowing phthalic acid to react with the alcohol under a nitrogen atmosphere; removing an unreacted alcohol and neutralizing an unreacted acid; and dehydrating and filtering the resulting reaction solution through distillation under reduced pressure.

Meanwhile, the catalyst used in the blending method may, for example, include one or more selected from acid catalysts such as sulfuric acid, hydrochloric acid, phosphoric acid, nitric acid, p-toluenesulfonic acid, methanesulfuric acid, ethanesulfuric acid, propanesulfuric acid, butanesulfuric acid, alkyl sulfuric acid, etc., metal salts such as aluminum lactate, lithium fluoride, potassium chloride, cesium chloride, calcium chloride, iron chloride, aluminum phosphate, etc., metal oxides such as heteropoly acid, etc., organic metals such as natural/synthetic zeolite, cation and anion exchange resins, tetra-alkyl titanate, and polymers thereof. As one specific example, tetra-alkyl titanate may be used as the catalyst.

An amount of the catalyst used may vary depending on the type of catalyst. For example, a homogeneous catalyst may be used in a content range of 0.01 to 5% by weight, 0.01 to 3% by weight, 1 to 5% by weight, or 2 to 4% by weight, based on a total of 100% by weight of the reactants, and a heterogeneous catalyst may be used in a content range of 5 to 200% by weight, 5 to 100% by weight, 20 to 200% by weight, or 20 to 150% by weight, based on a total of 100% by weight of the reactants.

In this case, a reaction temperature may be in a range of 180 to 280° C., 200 to 250° C., or 210 to 230° C.

The plasticizer composition thus prepared may be included in a content range of 5 to 150 parts by weight, 40 to 100 parts by weight, or 40 to 50 parts by weight, based on 100 parts by weight of a resin selected from ethylene vinyl acetate, polyethylene, polypropylene, polyvinyl chloride, polystyrene, polyurethane, and a thermoplastic elastomer, and thus a resin composition effective for all of compound formulation, sheet formulation, and plastisol formulation may be provided.

For example, the plasticizer composition may be applied to manufacture an electric wire, a flooring material, an automotive interior material, a film, a sheet, wallpaper, or a tube.

The invention claimed is:
1. A plasticizer composition comprising:
an epoxidized compound;
a phthalate-based material; and
a terephthalate-based material,
wherein the epoxidized compound is one or more selected from the group consisting of epoxidized soybean oil, epoxidized castor oil, epoxidized linseed oil, epoxidized palm oil, epoxidized stearic acid, epoxidized oleic acid, epoxidized tall oil and epoxidized linoleic acid,
wherein the epoxidized compound and the phthalate-based material are included at a weight ratio of 90:10 to 10:90, and
wherein the phthalate-based material comprises one or more selected from the group consisting of diisodecyl phthalate (DIDP), diisononyl phthalate (DINP), and dipropylheptyl phthalate (DPHP).

2. The plasticizer composition of claim 1, wherein the epoxidized compound is one or more selected from the group consisting of epoxidized soybean oil (ESO) and epoxidized linseed oil (ELO).

3. The plasticizer composition of claim 1, wherein the epoxidized compound and the phthalate-based material are included at a weight ratio of 50:50 to 10:90.

4. The plasticizer composition of claim 1, wherein the terephthalate-based material is one single compound or a mixture of two or more compounds selected from the group consisting of di(2-ethylhexyl) terephthalate (DEHTP), diisononyl terephthalate (DINTP), di(2-propylheptyl) terephthalate (DPHTP), dibutyl terephthalate (DBTP), butyl isononyl terephthalate (BINTP), butyl (2-ethylhexyl) terephthalate (BEHTP), and (2-ethylhexyl)isononyl terephthalate (EHINTP).

5. The plasticizer composition of claim 1, wherein the terephthalate-based material is included at a content of 10 to 300 parts by weight, based on 100 parts by weight of the sum of weights of the epoxidized compound and the phthalate-based material.

6. A resin composition comprising 100 parts by weight of a resin and 5 to 150 parts by weight of the plasticizer composition defined in claim 1.

7. The resin composition of claim 6, wherein the resin comprises one or more selected from the group consisting of ethylene vinyl acetate, polyethylene, polyketone, polypropylene, polyvinyl chloride, polystyrene, polyurethane, and a thermoplastic elastomer.

8. The resin composition of claim 6, wherein the resin composition comprises one or more materials for products selected from the group consisting of an electric wire, a flooring material, an automotive interior material, a film, a sheet, wallpaper, and a tube.

9. A method for preparing a plasticizer composition, comprising:
preparing an epoxidized compound, and a phthalate-based material;
blending the epoxidized compound and the phthalate-based material at a weight ratio of 90:10 to 10:90 to obtain a plasticizer composition; and
mixing a terephthalate-based material with the plasticizer composition after the blending to obtain the plasticizer composition,
wherein the epoxidized compound is one or more selected from the group consisting of epoxidized soybean oil, epoxidized castor oil, epoxidized linseed oil, epoxidized palm oil, epoxidized stearic acid, epoxidized oleic acid, epoxidized tall oil and epoxidized linoleic acid, and
wherein the phthalate-based material comprises one or more selected from the group consisting of diisodecyl phthalate (DIDP), diisononyl phthalate (DINP), and dipropylheptyl phthalate (DPHP).

* * * * *